A. OHMSTEDE.
PLUNGER.
APPLICATION FILED AUG. 31, 1911.
1,018,517.
Patented Feb. 27, 1912.
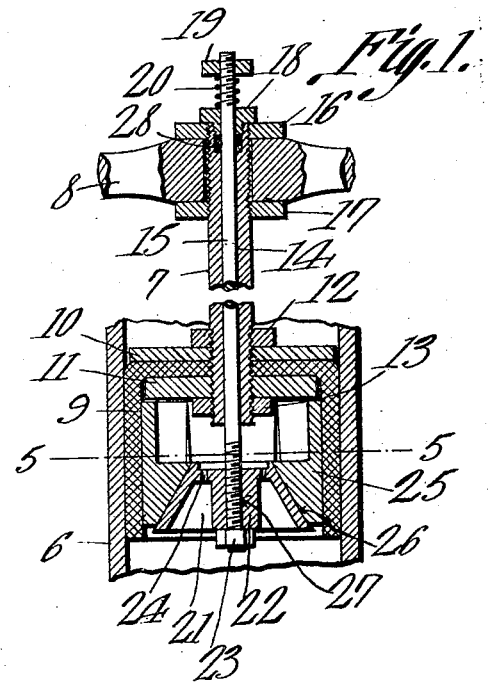
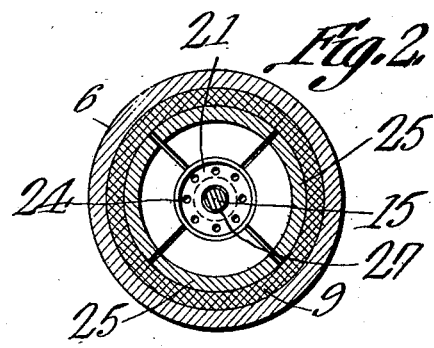
A. Ohmstede, Inventor
by C. A. Snow & Co., Attorneys
Witnesses

UNITED STATES PATENT OFFICE.

AUGUST OHMSTEDE, OF BEAUMONT, TEXAS, ASSIGNOR OF ONE-HALF TO BRADLEY W. BELL, OF BEAUMONT, TEXAS.

PLUNGER.

1,018,517.

Specification of Letters Patent.

Patented Feb. 27, 1912.

Application filed August 31, 1911. Serial No. 647,097.

*To all whom it may concern:*

Be it known that I, AUGUST OHMSTEDE, a citizen of the United States, residing at Beaumont, in the county of Jefferson and State of Texas, have invented a new and useful Plunger, of which the following is a specification.

This invention relates to plungers or pistons, which are employed to reciprocate in the cylinders of pumps, air-compressors, and the like, and this invention has for its principal object to provide a tight sliding fit between the plunger and the cylinder in which it is made to reciprocate. The common construction of plungers of this character includes a packing of leather, or other pliable material, on the sliding face of the plunger which forms a smooth and tight sliding fit between the plunger and cylinder.

A further object is to provide means for expanding the packing from the exterior of the cylinder.

Another object is to provide means for expanding the packing equally along the whole length thereof, as is preferable.

This invention is embodied in a novel construction, arrangement and combination of parts, as will be hereinafter set forth in the appended claim.

This invention, as shown and described, is especially applied to air compressors, or pumps, or it may be applied and adapted to various other uses.

The invention is illustrated in the accompanying drawings, in which similar characters indicate similar parts, and in which—

Figure 1 is a longitudinal central section of my invention. Fig. 2 is a section on the line 5—5 of Fig. 1.

Referring specifically to the drawings, there is shown at 6 a suitable cylinder or barrel in which the plunger is reciprocated. The plunger consists of an inverted cup-shaped packing 9 of pressed leather or other suitable material, which is mounted on a plunger rod or stem 7, the side of the said packing being shaped to conform with the inside of the cylinder, and means are provided for expanding the sides of the said cup-shaped packing to form a snug fit with the cylinder. The means for mounting the said packing 9 and the means for expanding the said packing 9 will be described presently. The longitudinal plunger rod 7 has its lower end passing through the end of the cup-shaped packing 9, and has the lower end thereof externally screw-threaded. The respective washers 10 and 11 on the said plunger rod on the outer and inner faces of the end of the cup-shaped packing 9 clamp the said end securely therebetween by means of the nuts 12 and 13, as will be understood. In this manner the said packing 9 is secured to the lower end of the plunger rod. The upper end of the plunger rod 7 is externally screw-threaded and passes through a handle 8, the nuts 16 and 17 on the top and bottom, respectively, of the handle, clamping the said handle in position. A longitudinal passage 14 extends through the plunger rod 7, and a spindle 15 has a sliding fit therein and protrudes out both ends of the plunger rod, the ends thereof being externally screw-threaded.

Within the cup-shaped packing 9 is a ring 25 fitting snugly on the inner side thereof, and which is split longitudinally at several points around the periphery thereof to form several disconnected sections capable of radial movement. At the lower end this ring 25 has an outward tapered seat 26 on the inner side thereof, and a spreader 21 having an inward tapered face engages in the said seat 26. A boss 22 depends from the said spreader 21 and the lower end of the spindle 15 passes through a hole 27 in the said boss. A nut 23 on the lower end of the spindle supports the spreader 21 on the lower end of the spindle 15. A plurality of holes 24 pass through the spreader from the top to the bottom thereof. Thus, when the spindle 15 is raised, the spreader is drawn upward or into the cup-shaped packing thereby radially spreading the sections of the ring 25 to expand the side of the cup shaped packing 9. It will be seen that the ring 25 is expanded equally along its longitudinal portions, and therefore equally expanding the packing along the length thereof to compensate for any wear thereof. The holes 24 are provided to permit the escape of the air from within the cup-shaped packing 9 upon the spreader being forced inwardly or upwardly therein, and thus allow the spreader to move freely to and from the interior of the cup-shaped packing.

At the upper end of the plunger rod 7 is a stuffing box 28 and a gland nut 18 which closes the passage 14, thus preventing the escape of air or fluid therethrough. The spindle 15 passing through the gland nut 18 has the upper nut 19 on the threaded portion thereof and a coiled spring 20 is compressibly disposed between the said nut 19 and the gland 18 to give an upward tension to the spindle 15, and thus yieldingly tend to automatically raise the spreader 21 to expand the packing 9. This tension can be regulated by adjusting the nut 19. Thus, by screwing the nut 19 inward the tension on the spindle may be increased to give an increased expansive effort, and vice versa. Ordinarily the handle 8 is located outside of the cylinder 6, the plunger rod passing through the head of the cylinder, as is common in hand bicycle and automobile tire pumps. By having the spindle pass out of the said plunger rod, the plunger may be adjusted from without the cylinder.

In use, these plungers are adapted to compress the air at the lower end of the cylinder, below the plunger, and it will be seen that the objects aimed at have been attained in an efficient, simple and convenient manner.

The invention is capable of alterations within the scope of the appended claim, and without departing from the spirit of the invention.

Having described the invention, what I claim as new is:

The combination of a plunger rod, a spindle passing therethrough, a cup-shaped packing mounted on one end of the plunger rod, the plunger rod having a stuffing box in the other end thereof, a handle on the latter end of the plunger rod, a split ring fitting snugly within the packing and having an inner tapered seat, a spreader having a tapered face engaging the said seat, one end of the spindle being passed through the said spreader, a nut screw-threaded upon the said end of the spindle, a gland nut for the said stuffing box, a nut screw-threaded upon the other end of the spindle, and a compression spring disposed between the latter nut and the gland nut, as and for the purpose set forth.

In testimony that I claim the foregoing as my own, I have hereto affixed my signature in the presence of two witnesses.

AUGUST OHMSTEDE.

Witnesses:
B. LOONEY,
W. M. CROOK.